Sept. 8, 1970            J. P. MALEC            3,527,323
REMOTE FILL AIR LINE LUBRICATOR
Filed April 18, 1968
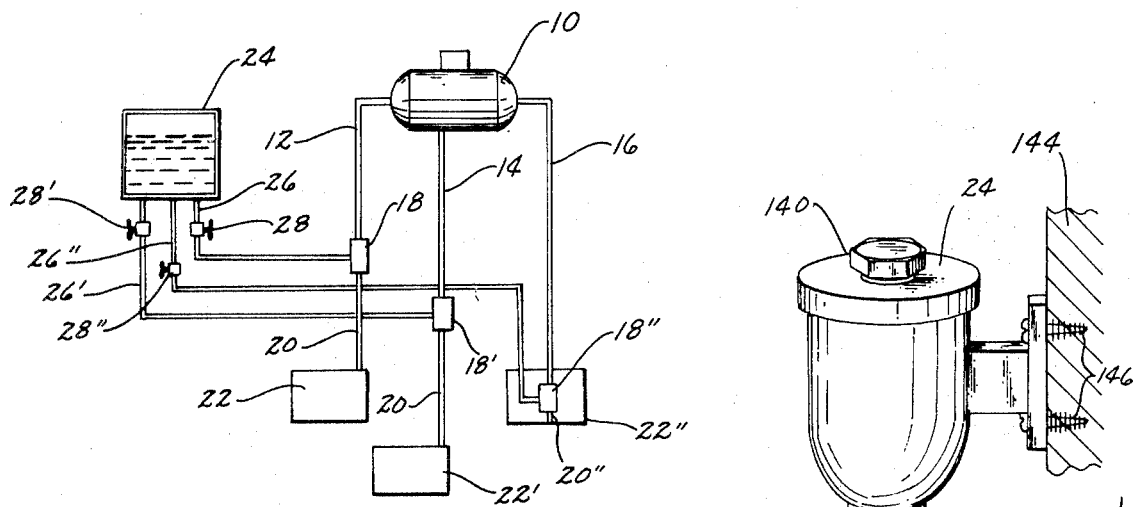
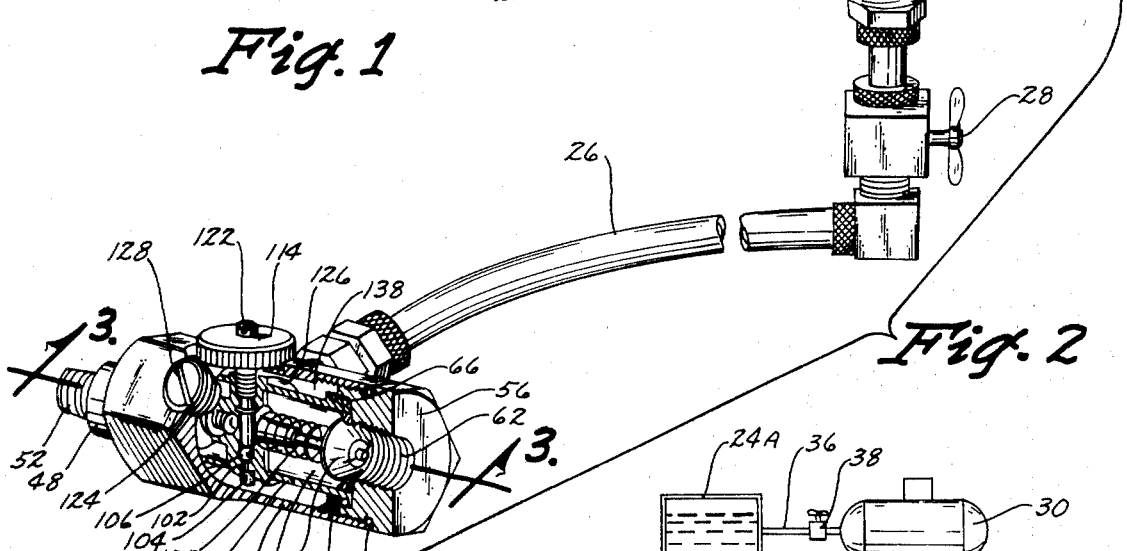
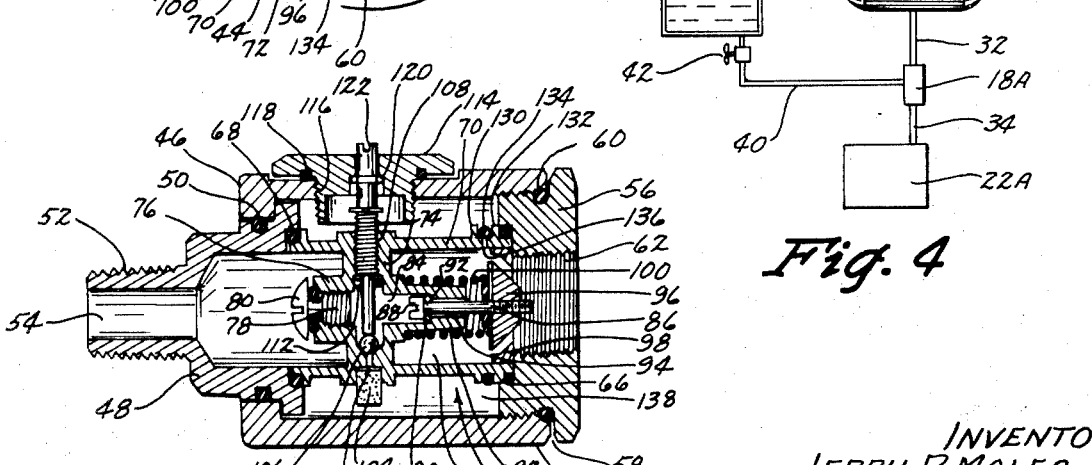
INVENTOR
JERRY P. MALEC
BY
Zarley, McKee & Thomte
ATTORNEYS United States Patent Office 3,527,323
Patented Sept. 8, 1970

3,527,323
REMOTE FILL AIR LINE LUBRICATOR
Jerry P. Malec, 2832 N. 70th Ave.,
Omaha, Nebr. 68106
Filed Apr. 18, 1968, Ser. No. 722,332
Int. Cl. F16n 7/34, 7/02
U.S. Cl. 184—55                                    4 Claims

ABSTRACT OF THE DISCLOSURE

A remote fill air line lubricator having an air intake end connected to a source of air under pressure and an air discharge end connected to the machine or apparatus to be lubricated. The lubricator is fluidly connected to an oil reservoir which is remotely spaced from the lubricator, machine and source of air pressure. The reservoir supplies oil to the lubricator which injects a predetermined amount of oil into the air passage therethrough to cause the lubrication of the machine. The oil reservoir may be fluidly connected to a plurality of lubricators if desired. The lubricator may be oriented in any relative position and may be mounted within the machine or apparatus as desired.

---

Conventional air line lubricators generally indicate a bowl-type lubricant reservoir which is in communication with the air line and which is usually mounted closely adjacent the machine to be lubricated. The conventional lubricators are extremely unsatisfactory due to the fact that: (1) The machines are not properly lubricated; (2) The lubricators are difficult to install; (3) The air lines must be shut down and the machine stopped when the reservoirs are filled; (4) The lubricant is easily contaminated since the lubricator is adjacent the operating machine; (5) The lubricators must be disassembled to refill the reservoir; (6) The lubricators are bulky; (7) The lubricators must be drained of the water or condensate formed therein; and (8) The lubricators must be constantly observed and serviced.

Applicant has patented lubricators which are extremely light weight and which introduce oil directly into the airstream thereby automatically lubricating the moving parts of the machine without causing a serious air pressure drop at the point of use. Applicant's lubricators have eleminated the back pressure problem usually associated with lubricators and has providers which have proven to be generally satisfactory. Applicant's lubricators are described in U.S. Letters Pat. Nos. 3,115,949.

Applicant's lubricators have a small lubricant reservoir provided in the interior thereof which must be refilled through a removable cap. Thus, applicant's lubricators must be periodically checked and refilled when the machine with which it is associated requires a large amount of lubrication.

Therefore, it is a principal object of this invention to provide a remote fill air line lubricator.

A further object of this invention is to provide an adjustable automatic lubricator for air lines.

A further object of this invention is to provide a remote fill air line lubricator including an oil reservoir which is remotely spaced from the lubricator.

A further object of this invention is to provide a remote fill air line lubricator which may be mounted in the interior of "buttoned up" or sealed machines.

A further object of this invention is to provide an air line lubricator including an oil reservoir remotely spaced therefrom which may be fluidly connected to a plurality of such lubricators.

A further object of this invention is to provide a remote fill air line lubricator which permits the reservoir to be mounted in any clean convenient area.

A further object of this invention is to provide a remote fill air line lubricator which insures that the machine will be properly lubricated.

A further object of this invention is to provide a remote fill air line lubricator wherein the lubricator may be installed in any relative position.

A further object of this invention is to provide a remote fill air line lubricator which requires a minimum of maintenance.

A further object of this invention is to provide a remote fill air line lubricator wherein the reservoir may be refilled while the air line is working and the machine running.

A further object of this invention is to provide a remote fill air line lubricator which occupies a minimum amount of space.

A further object of this invention is to provide a remote fill air line lubricator which prevents contamination of the lubricant.

A further object of this invention is to provide a remote fill air line lubricator which does not need to be disassembled to refill the reservoir.

A further object of this invention is to provide a remote fill air line lubricator which injects lubricant at a controlled rate into an attached appliance or machine.

A further object of this invention is to provide a remote fill air line lubricator including means to prevent the syphoning or draining of the fluid in the reservoir through the injector mechanism and into the compressed air or fluid line.

A further object of this invention is to provide a remote fill air line lubricator wherein the lubricant being injected into the air line is pressure equalized with the compressed air.

A further object of this invention is to provide a remote fill air line lubricator having means provided therein which prevents the release of lubricant into the air line when the air line is de-pressurized.

A further object of this invention is to provide a remote fill air line lubricator which performs satisfactorily regardless of the value of the pressure in the system.

A further object of this invention is to provide a remote fill air line lubricator which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a schematic view of a typical lubricator installation;

FIG. 2 is a partial perspective view of the device with portions thereof cut away to more fully illustrate the invention;

FIG. 3 is an enlarged sectional view as seen along lines 3—3 of FIG. 2; and

FIG. 4 is a schematic view illustrating another typical lubricator installation.

In FIG. 1, the numeral 10 generally designates a source of compressed air having at least one air line 12 extending therefrom. FIG. 1 also illustrates air lines 14 and 16 extending therefrom which are merely provided to illustrate the various installations of the system. The numeral 18 generally designates an injector which is positively connected to line 12 while the numerals 18' and 18" refer to injectors which are identical to injector 18. An air line 20 connects injector 18 with a machine 22 which may be any machine requiring lubrication such as pneumatic tools, hydraulically operated transfer machines, power packages or any other machines requiring lubrication. The numerals 22' and 22" also designate the machines to be lubricated. Machine 22' is connected to injector 18' by a conduit 20' while machine 22" is connected to injector 18" by a conduit 20".

The numeral 24 designates an oil reservoir having a plurality of pipes or tubes 26, 26' and 26" extending therefrom which are preferably constructed of flexible plastic tubing or the like. Stopcocks 28, 28' and 28" are mounted in the pipes 26, 26' and 26" respectively and may be operated to control the flow of fluid therethrough as desired. As seen in FIG. 1, pipes 26, 26' and 26" are connected to injectors 18, 18' and 18" respectively. FIG. 1 illustrates a single reservoir 24 supplying fluid or lubricant to three injectors but it should be understood that the number of injectors may vary from one to 50 for example. FIG. 1 illustrates injectors 18 and 18' being spaced from the machines 22 and 22' respectively which is perhaps the normal installation. However, FIG. 1 also illustrates injector 18" being installed in a "buttoned up" or sealed machine which is sometimes desirable.

In FIG. 4, a slightly different installation from that of FIG. 1 is illustrated wherein the numeral 30 designates an air compressor or the like operatively connected to an injector 18A by means of an air line 32. Injector 18A is connected to the machine 22A by means of an air line 34. Compressor 30 is in communication with reservoir 24A by means of a conduit or air line 36 extending therebetween having a stopcock 38 imposed therein. Reservoir 24A is connected to injector 18A by means of a pipe or lube 40 having a stopcock 42 imposed therein. The installation illustrated in schematic form in FIG. 4 is essentially the same as that which is illustrated in FIG. 1 except that the reservoir is pressurized by means of it being directly connected to the source of air pressure by the conduit 36.

Injector 18 which is illustrated in FIGS. 2 and 3 is very similar to the oiler illustrated in applicant's Pat. No. 3,115,949 with certain changes to permit its use in the system of this invention. Injector 18 includes a case 44 which is seen to be hexagonal in FIG. 2 and which has a hollow interior. The forward end 46 of case 44 has a male swivel 48 rotatably mounted therein and having a seal 50 positioned therebetween. Swivel 48 includes a threaded exterior portion 52 which is operatively connected to the conduit 20. Swivel 52 has a bore 54 extending therethrough as best illustrated in FIG. 3. An air inlet cap 56 is threadedly secured to the inlet end 58 of case 44 and a seal 60 is provided therebetween. As seen in FIG. 3, cap 56 is provided with an internally threaded bore 62 which would threadedly receive conduit 12 or the like. A metering assembly 64 is mounted in the interior of case 44 and is positioned between the rearward end of cap 56 and the forward end of swivel 48 as illustrated in FIG. 3. A seal 66 is positioned between cap 56 and the forward end of metering assembly 64 while a seal 68 is positioned between the forward end of metering assembly 64 and the rearward end of swivel 48 as indicated in FIG. 3. Metering assembly 64 is comprised of a generally cylindrical shaped housing 70 having an internal compartment area 72 formed forwardly of a spoke support portion 74. The numeral 76 generally designates a central tubular stem conduit extending rearwardly from the spoked web support portion 74 and is provided with a central bore 78 formed therein, the rearward end of which is threadedly closed by a screw 80. The numeral 82 generally designates a stem conduit which extends forwardly from the spoke web support portion 74 and which has a bore 84 extending therethrough which slidably receives a metering screw 86 therein. Metering screw 86 includes a head portion 88 having an O-ring 90 mounted at the forward end thereof which engages a shoulder 92 formed in bore 84. For purposes of description, that portion of the bore 84 which is forwardly of shoulder 92 will be generally designated by the reference numeral 94.

A baffle 96 is threadedly mounted on the forward end of metering screw 86 and is adapted to move into sealing engagement with a venturi 98 provided at the forward end of metering assembly 64. A spring means 100 embraces stem portion 82 and engages the rearward end of baffle 96 to yieldably resist the rearward movement of the baffle 96 with respect to the venturi 98. An oil passageway 102 is formed in the lower portion of the support portion 74 and has a filter or screen means 104 mounted in the outer end thereof to filter the oil passing therethrough. The inner end of the passageway 102 is in the form of a valve seat and has a ball valve 106 mounted therein. A passageway 108 is provided in the upper portion of the spoked web support portion 74 and is adapted to threadedly receive oil adjusting screw 110 extending therethrough, the inner end of which is adapted to limit the movement of the ball valve 106 away from the valve seat portion. An O-ring 112 is mounted on the screw 110 as illustrated in FIG. 3. The screw 110 rotatably extends through a cap 114 which threadedly closes an opening 116 formed in case 44. A seal 118 is positioned between cap 114 and case 44 as illustrated in FIG. 3. Screw 110 has an O-ring seal 120 mounted thereon which engages cap 114 to seal the interior of the unit from the atmosphere. As seen in FIG. 3, the outer end of the screw 110 is provided with a notch 122 to facilitate the rotation thereof to adjust the relationship of the inner end of the screw 110 with respect to ball valve 106. Case 44 is provided with a pair of openings 124 and 126 which extend therethrough. Either of the openings may be closed by a suitable plug 128 while the other opening 126 is operatively placed in communication with the tube 26. The forward exterior portion of the cylindrical shaped housing 70 is provided with a pair of spaced apart annular flanges 130 and 132 having an O-ring 134 positioned therebetween. At least one port 136 extends through the housing 70 beneath the O-ring 134. The port 136 and the O-ring 134 comprise an air pressure equalizing valve. For purposes of description, the numeral 138 generally designates the compartment area in case 44 between the interior of case 44 and the exterior of housing 70. O-ring 134 normally seals port 136.

As seen in FIG. 2, the reservoir 24 has a fill cap 140 removably mounted thereon to permit the refilling of the reservoir. Reservoir 24 may be conveniently mounted on any supporting surface such as a wall 144 by means of screws 146 and would normally be positioned at a level higher than the injector 18. If desired, the reservoir 24 can be located quite distant from the injector 18 and could even be located in a separate room or the like which could be maintained in a clean condition to prevent the contamination of the lubricant during the filling of the reservoir 24. The reservoir 24 can be filled at any time during the operation of the machine 22 or the injector 18 by simply closing stopcock 28 and filling the reservoir. As soon as the reservoir is filled and the cover 140 replaced, the stopcock 28 would then be reopened to permit the flow of lubricant from the reservoir 24 to the injector 18 and to permit the flow of air bubbles from injector 18 to reservoir 24 as will be explained hereinafter.

In operation, the injector 18 is installed so that the air inlet cap 56 is placed in communication with the conduit 12 and so that the swivel 48 is placed in communication with the pipe or conduit 20. Injector 18 may be located in the machine, adjacent the machine or remote from the machine as illustrated in FIG. 1. The lubricant flows into compartment area 138 and would normally fill the same. The incoming flow of air impinges upon the baffle 96 and causes the same to be moved rearwardly against the force of the spring means 100. The rearward movement of the baffle 96 causes metering screw 86 to be moved rearwardly thereby unseating the O-ring 90 from the shoulder 92. The air flows around the baffle 96, through the compartment area 72, past the spoke web support portion 74, and outwardly through bore 54 and swivel 48 into pipe 20. The air passing between the baffle 96 and the venturi 98 creates a venturi effect which causes a suction to be exerted in the bore 94 which causes the oil to be drawn from the compartment area 138, through the screen 104, into passageway 102, past the ball valve 106, into bore 84 and through bore 94, into compartment area 72 where the oil will be picked up by the air passing therethrough. The oil adjusting screw 110 may be rotated so as to vary the permissible movement of the ball valve 106 with respect to its valve seat thereby controlling the amount of oil that will pass from compartment area 138 to bore 84. Likewise, baffle 96 may be threadedly moved with respect to the metering screw 86 to adjust its relationship with respect to the venturi 98 to vary the sensitivity of the device.

As previously stated, the port 136 and the O-ring 134 comprise an air pressure equalizing the valve which equalizes the pressure between the compartment areas 138 and 72. A small vacuum effect is created in the interior of reservoir 24 which would tend to impede the flow of lubricant therefrom if port 136 and O-ring 134 were not provided. A small amount of air passes through port 136 and around O-ring 134 at times and results in a plurality of small air bubbles being formed in the lubricant in the compartment area 138 which then moves through conduit 26 to the interior of reservoir 24 to replace the fluid being taken therefrom. When the flow of air is stopped, the baffle 96 is moved forwardly towards the venturi 98 by the spring means 100 which causes the O-ring 90 to seal against the shoulder 92 thereby preventing any lubricant from entering the air line while the same is inoperative. Likewise, the O-ring 134 seals the port 136 during those periods that the air is not being passed through the injector 18 which also prevents lubricant from entering the air stream.

The embodiment seen in FIG. 4 is identical to that illustrated in FIGS. 1–3 except that the source of air is directly connected to the reservoir 24A to pressurize the interior of the reservoir which aids in forcing the lubricant therein to the injector 18 and which replaces the lubricant being removed therefrom.

Thus it can be seen that a remote fill air line lubricator has been provided which is easy to refill and which may be filled in an area wherein the lubricant will not become contaminated. The lubricator insures that the machine will receive the proper lubrication without being constantly checked due to the size of the reservoir 24 which may be sufficiently large to supply as many as 50 lubricators. Water or condensate will never collect in the system which obviously reduces the maintenance problems usually connected therewith. The reservoir may be filled while the air line is working and the machines are running which eliminates any "down time." It can also be appreciated that the lubricator 18 is extremely small and may be mounted in spaces wherein it has been previously impossible to mount the conventional lubricators. The lubricator of this invention also may be mounted in the interior of "buttoned up" or closed machines since it does not need to be observed or adjusted once the unit has been installed thereinto. Preferably, the tube 26 is of transparent material to permit the observation of the lubricant flow therethrough which means that the injector or the reservoir 24 be closely observed. It can also be seen that the injector, by means of port 136 and O-ring 134, provide a means for pressure equalizing the lubricant with the air line. It can also be seen an injector has been described which is automatic in operation and which does not have to be constantly readjusted to control the amount of lubricant being supplied thereby. The lubricator 18 may be positioned vertically, horizontally or any other attitude with respect to the machine as it will function in any of such attitudes. If desired, the case 44 can be provided with a transparent window provided therein to permit the observation of the O-ring 134 so that the phenomenon of the air replacing the lubricant in the reservoir may be observed thereby permitting the observation of the amount of air bubbles being formed which has a direct relationship with the oil consumption. Such observation permits the phenomenon to be monitored and adjusted if desired.

While the operation of the lubricator has been described as being designed to supply lubricant to air passing through the injector 18, it can be appreciated that the device also can be used as a metering device. For example, a controlled amount of fluid from reservoir 24 could be supplied to a fluid passing through the device.

It can be seen that applicant's lubricant injector is superior to the conventional lubricator mechanisms since those mechanisms cannot operate without either a float valve, one-way check valve and/or sealing device to operate when the air pressure is off to prevent the lubricant from being dumped into the air line.

Thus it can be seen that the device accomplishes at least all of its stated objectives.

Some changes may be made in the construction and arrangement of my remote fill air line lubricator without departing from the real spirit and purpose of my invention, and it is my intention to cover by my claims, any modified forms of structure or use of mechanical equivalents which may be reasonably included within their scope.

I claim:

1. In combination,
 a source of fluid under pressure,
 a lubricant injector having fluid inlet and outlet ends, said inlet end being fluidly connected to said fluid source by a first conduit means,
 a machine remote from said fluid source and being fluidly connected to the outlet end of said injector by a second conduit means,
 a lubricant reservoir spaced remotely from said injector and said machine and being fluidly connected to said injector,
 said injector adapted to inject a predetermined quantity of lubricant from said reservoir into the fluid passing through said injector,
 said injector including means for preventing the draining of the lubricant in said reservoir through said injector and into said second conduit means when pressure differentials exist in said first and second conduit means or when said second conduit means is disconnected from said machine,
 said injector including a cylindrical housing having an air inlet port in its rear end and an air outlet port in its forward end, said housing including a fluid chamber, a spoke support in said housing, a tubular conduit on said support extending in the longitudinal center of said housing, means within said housing for equalizing the air pressure of said chamber with the air pressure around said tubular conduit, an oil passageway in said spoke support communicating with the inside of said tubular conduit and said oil reservoir, a shaft slidable in said tubular conduit, a head on said shaft, an arcuate ring mounted in said housing adjacent said inlet port and having at least a portion of its inner perimeter complementary in shape to a portion of the outer surface of said head, and means for yieldingly holding said head and shaft in a direction towards said arcuate ring, said reservoir being in operative communication with said fluid chamber.

2. In combination,
 a source of fluid under pressure,
 a lubricant injector having fluid inlet and outlet ends, said inlet end being fluidly connected to said fluid source by a first conduit means,
 a machine remote from said fluid source and being fluidly connected to the outlet end of said injector by a second conduit means, a lubricant reservoir spaced remotely from said injector and said machine and being fluidly connected to said injector, said injector adapted to inject a predetermined quantity of lubricant from said reservoir into fluid passing through said injector, said injector including means for preventing the draining of the lubricant in said reservoir through said injector and into said second conduit means when pressure differentials exist in said first and second conduit means or when said second conduit means is disconnected from said machine, said injector including a housing having an air inlet port in its rear end and an air outlet port in its forward end, a cylindrical support in said housing having an outside diameter less than that of the inside diameter of said housing for producing a fluid chamber, an air pressure equalizing valve means between the inside of said support and said chamber, said support having its two ends open and communicating with the two ports, respectively, of said housing, an open support member in the forward end portion of said support, a tubular conduit on said support member extending in the longitudinal center of said support, a lubricant passageway in said support member and support communicating with the inside of said tubular conduit and said chamber, a shaft slidable in the rear end portion of said tubular conduit, a head on the rear end of said shaft, means yieldingly holding said head and shaft in a rearward direction, a valve means interconnecting said shaft and said tubular conduit capable of closing the rear end portion of said tubular conduit when said head and shaft are in a rear position of their sliding movement, said reservoir being operatively connected to said chamber.

3. The combination of claim 2 wherein said valve means is adjustable.

4. The combination of claim 2 wherein said air pressure equalizing valve means is comprised of a pair of spaced apart shoulders extending around said support, said support having an opening extending therethrough between said shoulders, and an O-ring mounted between said shoulders.

References Cited

UNITED STATES PATENTS

| 2,245,274 | 6/1941 | Holmboe et al. | 184—55 |
| 2,367,721 | 1/1945 | Gothberg et al. | 184—55 |
| 3,031,033 | 4/1962 | Burrows | 184—15 |
| 3,057,433 | 10/1962 | Rusche | 184—55 XR |
| 3,115,949 | 12/1963 | Malec | 184—55 |
| 3,188,010 | 6/1965 | James | 184—56 XR |
| 3,421,600 | 1/1969 | Gleason et al. | 184—81 |

FOREIGN PATENTS 461,195  11/1949  Canada.

MANUEL A. ANTONAKAS, Primary Examiner

U.S. Cl. X.R.

184—65